Oct. 17, 1967    L. A. ROSENTHAL    3,348,041
APPARATUS FOR THE CORONA DISCHARGE TREATMENT OF PLASTIC
SURFACES HAVING AN ADJUSTABLE LENGTH ELECTRODE ASSEMBLY
Filed Dec. 30, 1964    2 Sheets-Sheet 1

INVENTOR.
LOUIS A. ROSENTHAL
BY *Walter C. Kehm*
ATTORNEY

INVENTOR
LOUIS A. ROSENTHAL
BY
ATTORNEY

United States Patent Office 3,348,041
Patented Oct. 17, 1967

3,348,041
APPARATUS FOR THE CORONA DISCHARGE TREATMENT OF PLASTIC SURFACES HAVING AN ADJUSTABLE LENGTH ELECTRODE ASSEMBLY
Louis A. Rosenthal, Highland Park, N.J., assignor to Union Carbide Corporation, a corporation of New York
Filed Dec. 30, 1964, Ser. No. 422,253
10 Claims. (Cl. 250—49.5)

ABSTRACT OF THE DISCLOSURE

An adjustable length electrode assembly is provided for corona discharge treatment of plastic surfaces, such as plastic film, of various sizes. The assembly includes a longitudinally flexible electrode such as a helical spring, having a plurality of small edges for facile corona generation.

---

This invention relates to an adjustable length electrode assembly for applications which include the corona discharge treatment of plastic surfaces.

Adjustable length electrodes can advantageously be employed in various applications, an illustrative example of which is the corona discharge treatment of plastic surfaces, a treatment for rendering plastic surfaces polar and thus increasingly receptive and adherent to dissimilar materials including coatings, such as printing inks or decorative matter applied thereon. See for example, U.S.P. 3,113,208, issued Dec. 3, 1963, to G. W. Traver. Generally, for such treatment, one or more electrodes are mounted in close proximity with the plastic surface to be treated to provide an ionizing gap between electrode and surface. A conductive material is suitably placed in contact with the reverse side of the plastic surface for improved charge receptiveness of the plastic surface which assumes the polarity of the conductive material. Thereafter, a potential of sufficiently high magnitude to ionize the air in the gap is delivered to the electrode or electrodes and corona discharge applied to the plastic surface.

The discharge is generally cyclic in character i.e., a negative charge is sprayed onto the plastic surface and then charge reversal takes place as a positive charge is then deposited. The cycle is repeated for improved effectiveness of the corona discharge treatment. Where the potential is AC in character one or more electrodes may be employed. However, where DC potential is employed, at least two electrodes, one positive and one negative are required with the plastic surface being brought in sequence into gap proximity with each to effect the above cycle.

Appropriately, each electrode can extend across the width of the plastic surface to be treated and the plastic surface is moved by in spaced relationship thereto although either or both can be moved relative to the other, for treating extensive lengths of plastic surface. In such treatment, it is desirable that the electrode extend across substantially the full width of the plastic surface for full and uniform treatment thereof. Thus as the width of, for example, plastic film increases, longer electrodes are desirable and where such film width decreases, shorter electrode lengths are also desirable to avoid wasted power and possible arcing beyond the film edges from electrode to conductive material. Arcing, of course, effectively shorts out corona discharge and is thus undesirable.

To meet the above problem of corona discharge treating varying dimensions of plastic surfaces, adjustable length electrodes have been developed, which consist generally of a conductive belt under tension on pulleys wherein the effective length thereof is adjusted by varying the distance between the pulleys.

The presently available adjustable length electrodes are, like the apparatus above, somewhat complicated, costly and difficult to install. In addition these electrodes generally require very high voltages since they are not constructed with many edges of small radius of curvature which serve to provide localities of high field intensity and therefore intense corona discharge upon delivery of relatively low voltage thereto. An adjustable length electrode which substantially overcomes these shortcomings has heretofore not been known.

Accordingly, it is an object of this invention to provide an adjustable length electrode assembly of simple construction having many edges of small radius of curvature.

It is another object of this invention to provide an adjustable length electrode assembly suitable for employment in the corona discharge treatment of plastic surfaces.

These and other objects are provided in the present invention which provides an adjustable length electrode assembly comprising a longitudinally flexible conductive member having a plurality of edges of small radius of curvature projecting from the longitudinal axis thereof, means for adjusting the longitudinal extension of said member and thus the separation of said edges and means for delivering voltage potential to said member.

The invention is illustrated in the accompanying drawings in which.

Figure 1:
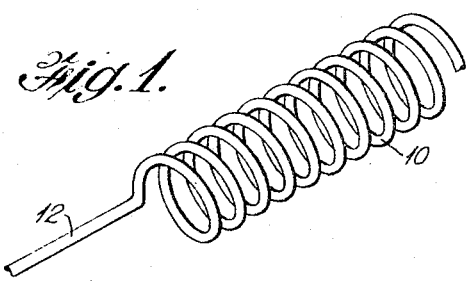
FIGURE 1 is an isometric projection of an electrode embodying the invention in the form of a helically wound spring.
Figure 2:
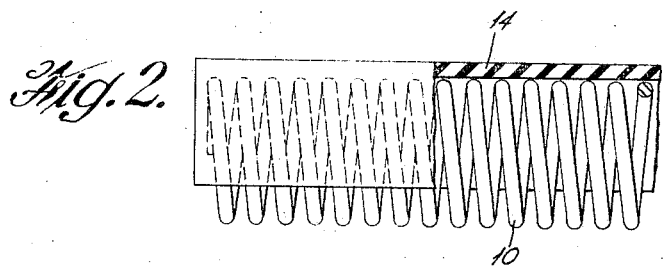
FIGURE 2 is an elevation view of an electrode embodying the invention partially enclosed in a dielectric sleeve.
Figure 3:
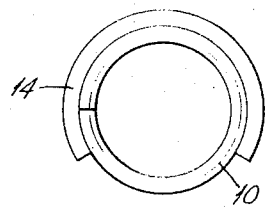
FIGURE 3 is a cross-sectional elevation of the electrode and dielectric sleeve of FIGURE 2.
Figure 4:
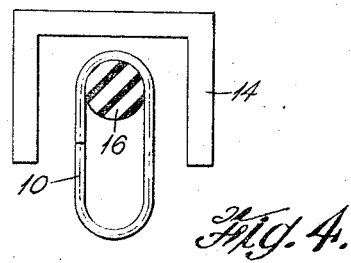
FIGURE 4 is a cross-sectional elevation illustrating another embodiment of the electrode and sleeve of FIGURE 2.

Referring now to the drawings, helically wound electrode or conductive member 10, partially enclosed in dielectric support sleeve 14, is adapted to be connected to high potential voltage supply (not shown) by lead 12 as shown in FIGURES 1, 2, and 3. The electrode 10 can be a circularly wound helix as illustrated in FIGURE 3 or wound substantially flat and supported by rod 16 within dielectric sleeve 14 as shown in FIGURE 4.

Figure 8:
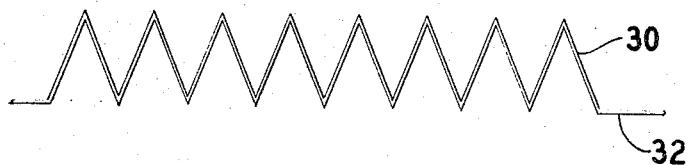
Figure 9:
Figure 10:
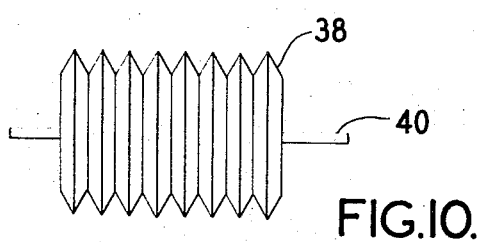

Other embodiments of the longitudinally extendable electrode of the invention include those shown in FIGURES 8, 9 and 10. There is provided in these figures flat zig-zag conductive member 30 having lead 32 as shown in FIGURE 8; lazy-tong structured conductive member 34 having lead 36, as shown in FIGURE 9 and conductive member 38 which has an accordion-like shape, with bellows, having lead 40, as shown in FIGURE 10.

Figure 5:
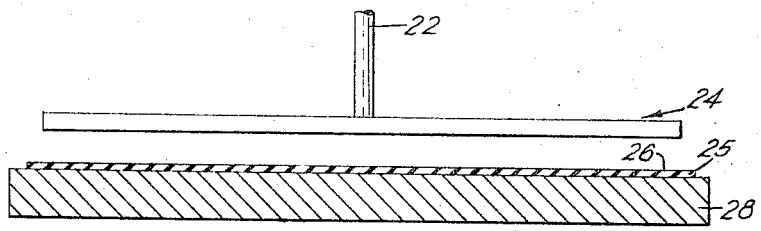
FIGURE 5 is a partial sectional elevation view illustrating a positioning of an electrode assembly embodying the invention for corona discharge treating of plastic surfaces.

The electrode 10 and support 16 or 14, represented in FIGURE 5, as electrode assembly 24, are suitably mounted to support 22 in ionizing gap proximity with surface 26 of plastic film 25, which is in contact with conductive material 28, for corona discharge treatment of the surface 26, upon application of high potential to the electrode 10. Conveying means (not shown) serve to move the film 25 through the gap for continuous treatment thereof.

Figure 6:
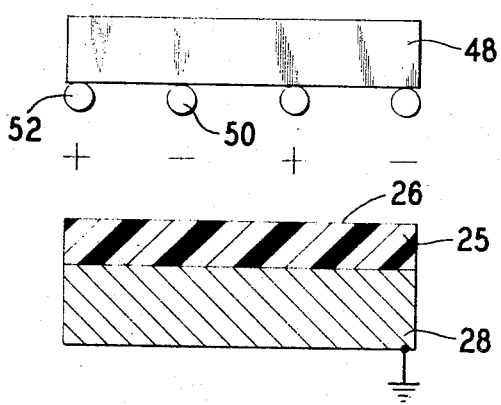
FIGURE 6 is a partial sectional elevation view illustrating another electrode assembly embodiment.
Figure 7:
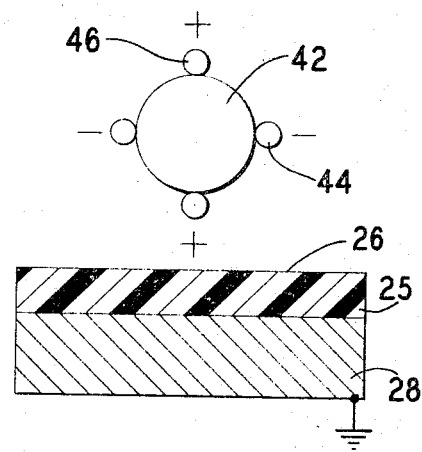
FIGURE 7 is a partial sectional elevation view illustrating another electrode assembly embodiment and FIGURES 8, 9 and 10 illustrate various embodiments of the electrode of the present invention.

In other electrode assembly embodiments, negative electrodes 50 and positive electrodes 52 spaced apart in alternate array, as shown in end-view in FIGURE 6, are mounted to nonconducting support 48 so as to be electrically insulated from one another. The electrodes 50 and 52 are mounted in ionizing gap-proximity with surface 26 of plastic film 25, which is in contact with conductive material 28 as discussed above. Conveying means (not shown) move the film 25 through the gap. In another embodiment, a plurality of the electrodes of the invention can be mounted to rotate about a common axis as shown in FIGURE 7. Negative electrodes 44 and positive electrodes 46 spaced in alternate array about nonconducting rotatable core 42, as shown in end-view in FIGURE 7. Means (not shown) are provided to rotate each electrode, in turn, into ionizing gap-proximity with surface 26 of plastic film 25 for corona-discharge treatment thereof. Conveying means move the film through the gap in contact with conductive material 28, as discussed above.

The longitudinal adjustment of the length of the electrode can be made in any convenient manner. Thus, the electrode length can be extended and shortened by hand and clamped in place to the support thereof or any suitable mechanical or other means available to those skilled in the art may be employed.

The electrode can be of any conductive material which can be fashioned into a longitudinally flexible, multi-edged shape, including metals and metal and plastic combinations. Preferably the electrode is made of a metal, for example, stainless steel, a highly conductive and durable material. Such materials are well known in the art and can be suitably selected for the desired application by the skilled practitioner.

The electrode or conductive member can take any form that provides a longitudinally extendable electrode with a plurality of edges of small radius of curvature. Such radius suitably ranges from about ⅛ inch or less to provide sharp knife edges where desired although the radius can exceed ⅛ inch in accordance with the desired application. Thus, the electrode can be in the form of a helical spring or wire, a spring or wire having a zig-zag shape, a lazy-tong structure, an accordion-like structure, a thin pleated sheet or sheets and the like.

The electrode of the invention is supported by any means convenient to the skilled practitioner. For example, where a helical spring is the electrode, a stiff dielectric rod can be inserted therein through at least a part of the length thereof or, as another means of support, a shape retentative dielectric sleeve, open along one longitudinal side thereof, can be fitted about the electrode so that at least a portion of the edges of the electrode are exposed. The sleeve thus employed serves additionally as a shield to direct the electrode discharge out the open side thereof. Rod and sleeve can also be employed together as illustrated, for example, in FIGURE 4. The support can also be a clamp which grips one end or another portion of the electrode and the like The support means is preferably of dielectric material but may also be of conductive material if in accord with the particular application.

The adjustable length electrode of the invention can find application wherever electrodes of diverse lengths are required as well as where such electrodes are further required to have a plurality of edges of sharp radius of curvature. Such application will be readily apparent to those skilled in the art. For example, the electrodes of the present invention, or a plurality thereof, are particularly suited to the corona discharge treatment of plastic surfaces. As hereinbefore indicated, the electrode of the invention can be positioned in spaced relationship with the plastic surface to be treated and extended substantially across the width thereof at a selected angle with the direction of the relative movement of the plastic surface. The length of the electrode can then be readily adjusted to treat varying widths of plastic surfaces.

The voltage potential is delivered to the electrode of the invention from any conventional AC or DC source including a generator and a battery and will vary with the application. For corona discharge treatment of plastic surfaces, a high potential is required, from 10,000 to 50,000 volts or more. The applied electrode potential in such treatment can be AC, where the electrode of the invention is employed in AC corona treatment such as disclosed, for example, in U.S.P. 3,113,208, supra, or DC corona treatment such as disclosed in copending application having the Ser. No. 213,745, filed by L. A. Rosenthal July 31, 1962 now U.S. Patent 3,196,270. A plurality of electrodes of the invention may also be mounted to rotate about a common axis to pass in sequence in ionizing gap proximity with the plastic surface to be treated with, suitably, high potential of opposing polarity being applied to radially adjacent electrodes for corona discharge treatment of such surface. Thus, one or more of the electrodes of the invention can be employed in place of the conventional one-size electrode with the advantages of adaptability herein discussed.

In addition to the adjustable length character of the electrode of invention, another important feature thereof is the provision of a plurality of edges of small radius of curvature which project from the longitudinal axis of the electrode. Such edges can serve in the above corona discharge treatment, for example, to provide localities or focal points of high field intensity and thus intense corona discharge upon delivery of relatively low voltage thereto i.e., voltage lower than would be required were such edges not present to produce the corresponding field intensity. When the electrode is extended, the edges move apart, which tends to lower the effective corona discharge treatment per square unit of plastic surface in gap proximity therewith. However, the surface treatment tends to remain uniform since the discharge from each edge fans outwardly in all directions as it proceeds therefrom. Moreover for corona discharge treatment of plastic surfaces, the electrode edges or at least a portion thereof preferably describe a substantially uniform periphery on at least one longitudinal side thereof, to adapt the electrode to be positioned in close proximity with the plastic surface to be treated for creating an ionizing gap between such surface and periphery.

What is claimed is:

1. An adjustable length electrode assembly for corona discharge treatment of plastic surfaces comprising a longitudinally flexible conductive member having a plurality of edges of small radius of curvature projecting from the longitudinal axis thereof, to define a substantially uniform periphery on at least one longitudinal side of said member, said member adapted to be positioned in close proximity with the plastic surface to be treated for creating an ionizing gap between said surface and said periphery, a current conducting material on the reverse side of said plastic surface in proximity therewith and electrically isolated from said member, means for adjusting the longitudinal extension of said member and thus the separation of said edges and means for delivering a high potential to said member for ionizing the atmosphere in said gap for corona discharge treatment of said surface.

2. The electrode assembly of claim 1 wherein the conductive member is a helical spring.

3. The electrode assembly of claim 1 wherein the conductive member has a flat zig-zag shape.

4. The electrode assembly of claim 1 wherein the conductive member is a lazy-tong structure.

5. The electrode assembly of claim 1 wherein the conductive member is a structure having an accordion-like shape.

6. The electrode assembly of claim 1 having an open-sided dielectric sleeve support partially enclosing said conductive member along at least a portion of the length thereof so that at least a portion of said edges are exposed.

7. The electrode assembly of claim 1 wherein the conductive member is a helical spring, having a dielectric rod support extending longitudinally therein and an open sided dielectric sleeve partially enclosing said member along at least a portion of the length thereof so that at least a portion of said edges are exposed.

8. A plurality of the electrodes of claim 1 mounted on a rotatable member, means for rotating said member to pass said electrodes in sequence in said close proximity with said plastic surface for corona discharge treatment thereof.

9. A plurality of the electrodes of claim 1 mounted in said close proximity with said plastic surface and spaced apart from one another for corona discharge treatment thereof.

10. The electrode assembly of claim 1 wherein said current conducting material is in close contact with the reverse side of said plastic surface.

References Cited

UNITED STATES PATENTS 3,183,352  5/1965  Brandt et al. _____ 250—49.5
3,244,000  4/1966  Ballard _____ 313—146 X RALPH G. NILSON, *Primary Examiner.*

W. F. LINDQUIST, *Examiner.*